United States Patent [19]

Utecht

[11] Patent Number: 4,605,316
[45] Date of Patent: Aug. 12, 1986

[54] FLEXIBLY DAMPED SHAFT BEARING ARRANGEMENT, PARTICULARLY FOR USE IN ELECTRICAL MACHINERY

[75] Inventor: Manfred Utecht, Berlin, Fed. Rep. of Germany

[73] Assignee: Siemens Aktiengesellschaft, Munich and Berlin, Fed. Rep. of Germany

[21] Appl. No.: 634,913

[22] Filed: Jul. 26, 1984

[30] Foreign Application Priority Data

Aug. 4, 1983 [DE] Fed. Rep. of Germany ....... 3328362

[51] Int. Cl.[4] .................. F16C 27/02; F16C 27/06
[52] U.S. Cl. ......................................... 384/99; 384/215
[58] Field of Search .............. 384/99, 152, 192, 215, 384/219, 247, 253, 257, 258, 259, 260, 302, 428, 117, 535, 581, 582, 576, 220

[56] References Cited

U.S. PATENT DOCUMENTS

| | | | |
|---|---|---|---|
| 2,209,140 | 7/1940 | Rybar | 188/378 |
| 3,485,538 | 12/1969 | Nogle et al. | 384/215 |
| 3,589,782 | 6/1971 | Le Breton | 384/215 |
| 3,994,541 | 11/1976 | Geary et al. | 384/117 |
| 4,366,994 | 1/1983 | Yoshioka | 384/99 |
| 4,392,751 | 7/1983 | Ida et al. | 384/247 X |

FOREIGN PATENT DOCUMENTS 192621 11/1982 Japan .................................. 384/397

Primary Examiner—Stuart S. Levy
Assistant Examiner—Lynn M. Sohacki
Attorney, Agent, or Firm—F. W. Powers; J. L. James

[57] ABSTRACT

A flexibly damped shaft bearing arrangement with a bearing housing that surrounds the shaft in a ring, and a movable bearing support, which contains the shaft bearing and is suspended radially by springs in the bearing housing, contains a fluid pressure cushion between the bearing housing and the bearing support for damping purposes. In order to be able to adapt this shaft bearing arrangement for electrical machines in various states or stages of operation, there is provided, according to the invention, between the bearing housing and the bearing support, an second stage elastic suspension, which, when the machine equipped with such bearings is not operating, has a clearance with respect to the bearing support, which is smaller than the potential spring excursion of the bearing support. The clearance and the rigidity of the second stage suspension are designed to be adjusted or exchanged.

15 Claims, 5 Drawing Figures

U.S. Patent  Aug. 12, 1986  Sheet 1 of 3  4,605,316

FLEXIBLY DAMPED SHAFT BEARING ARRANGEMENT, PARTICULARLY FOR USE IN ELECTRICAL MACHINERY

BACKGROUND OF THE INVENTION

The invention relates to a flexibly damped shaft bearing arrangement, particularly for use in electrical machines. The arrangement includes a bearing housing that surrounds the shaft in a ring, and a movable bearing support, which contains the shaft bearing and is suspended radially by springs in the bearing housing, with a recess, provided with lateral seals, being left between the bearing housing and the bearing support, in order to accomodate a fluid pressure cushion.

A flexibly damped shaft bearing arrangement is disclosed in U.S. Pat. No. 3,994,541. In this shaft bearing arrangement, the movable bearing support consists of two rings, which are connected with one another by a series of flexure springs (for example bar springs). By means of the spring suspension of the movable bearing support that is achieved, in conjunction with the fluid pressure cushion, an external damping of the bearing is produced, which in turn causes a damping of the vibrations proceeding from the shaft that occur at resonant frequencies. An essential requirement for the effectiveness of this external damping of the bearing is an optimum adjustment of the elastic suspension of the bearing support through the dimensioning of the flexure springs to the dynamic characteristics shaft bearing system, which are essentially determined by the operating behavior of the parts of the machine that run on bearings and are connected with the shaft. If the dynamic parameters of this system remain virtually constant, the adjustment of the elastic suspension poses no problems.

If, on the other hand, different operating states of a machine produce changes, for example as the result of hydro-dynamic or gas-dynamic or magnetic forces, in the force or rigidity constellations of the parts mounted on the shaft, there will be difficulties in adjusting the external damping of the bearing. This is particularly true of electrical machines, in which, an unidirectional magnetic pull, which acts as a negative spring, can occur in the air gap. In this case a distinction must be made between static magnetic pull from nonrotating eccentricity and dynamic magnetic pull resulting from rotating eccentricity or corresponding magnetic rigidities.

In particular, the static magnetic residual force from unavoidable static eccentricity has a very unfavorable effect on the conventional external damping of the bearing. It causes an additional static deflection of the rotor and a resulting shift of the movable bearing support in the fluid pressure cushion, at worst, to the point of contact, so that damping effect is sharply reduced or completely eliminated.

The dynamic magnetic pull acts like a negative shaft rigidity and thereby affects the critical rotating speed, which is therefore significantly different for the excited and nonexcited states or stages of the electrical machine. As a result, both states or stages require different rigidities for the suspension of the bearing flange, if the external damping of the bearing is to be optimally adjusted.

The conventional external damping of the bearing must therefore be designed for the less favorable (i.e. the excited), state stage of the electrical machine. It follows necessarily that the adjustment for the nonexcited state can no longer be optimal, so that under certain circumstances impermissibly large oscillations will occur when, for example, a generator is being run up or is running nonexcited or when a motor is slowing down.

SUMMARY OF THE INVENTION

One object of the invention is therefore to design a flexibly damped shaft bearing arrangement of the kind described above in such a manner that is can be optimally adjusted for force and/or rigidity constellations that undergo changes in the course of operation.

To accomplish this object, a flexibly damped shaft bearing arrangement is equipped, according to the invention, between the bearing housing and the bearing support, with a dual stage elastic suspension, which, when the machine containing the bearings is not operating, has a clearance with respect to the bearing support that is smaller than the potential spring excursion of the bearing support. As a result of this double elastic suspension, whose two elements have a clearance with respect to one another, which, under certain operating conditions, may be bridged, the machine is provided with two optimizable elastic bearing suspensions that are independent of one another; each of which can be optimally adjusted to an important operating state. The clearance can be dimensioned in such a way as to determine how long the only one elastic bearing suspension, first stage is operative and when, as a result of the parallel combination of the two suspensions, an increased second stage rigidity, with a consequent change in the bearing characteristics, is produced.

In order to be able to adjust or change the characteristics of the shaft bearing arrangement even after installation, it is desirable that the clearance between the movable bearing element and the second stage suspension, be adjustable.

Other features and advantages of the present invention will become apparent from the following detailed description, and from the claims.

For a full understanding of the present invention, reference should now be made to the following detailed description and to the accompanying drawings.

DETAILED DESCRIPTION

Figure 2:
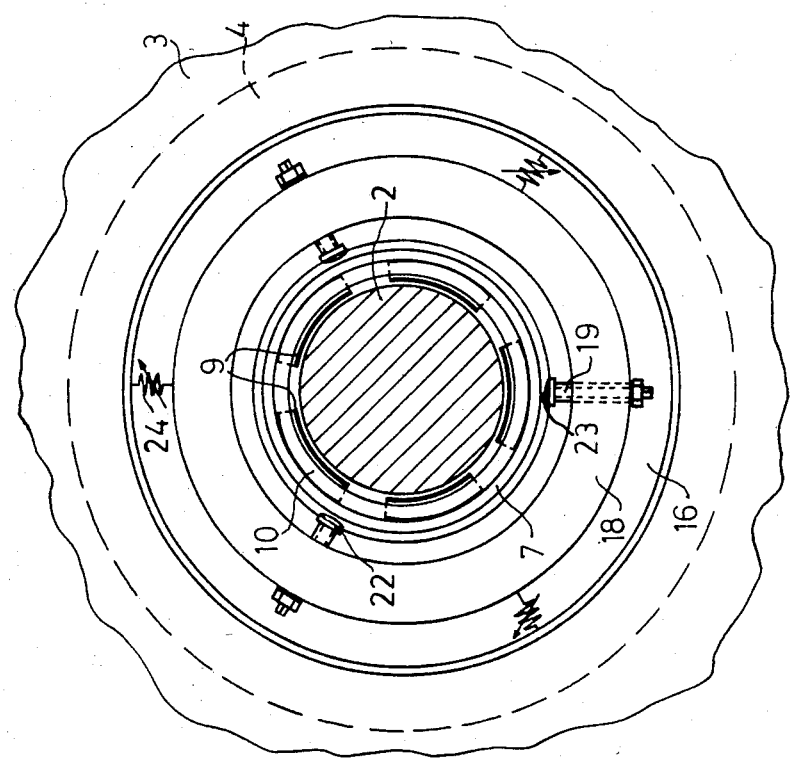
FIG. 2 shows the corresponding side view of the shaft shown in FIG. 1.
Figure 1:
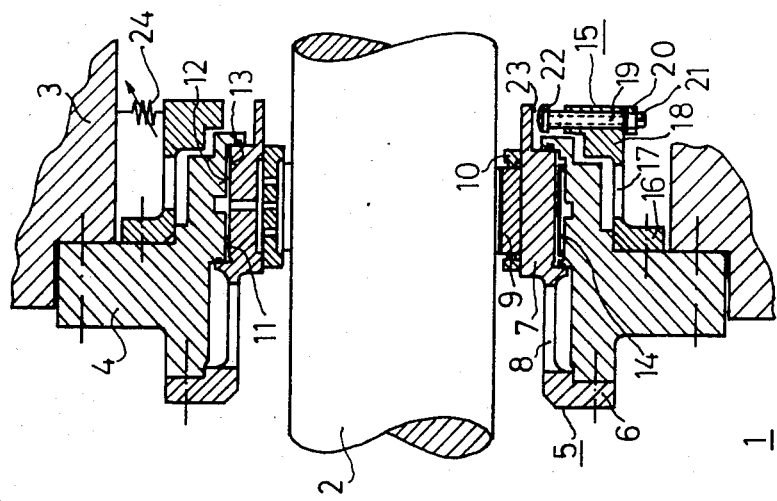
FIG. 1 shows a portion of a longitudinal section of a flexibly damped shaft bearing arrangement in accordance with the invention.

FIGS. 1 and 2 show a flexibly damped shaft bearing arrangement 1 for horizontal shaft 2 of an electrical machine. Shaft bearing arrangement 1 includes external bearing block 3 which is supported on a base. It bears bearing housing 4, which, just like bearing block 3, encircles shaft 2. In bearing housing 4 a first movable bearing support 5 is suspended by radial springs. This bearing support 5 consists of two rings 6 and 7, which are connected with one another by bar springs 8. Ring 6 is fastened to bearing housing 4; ring 7 supports the actual shaft bearing with bearing segments 9, which surround shaft 2 at equal intervals and are mounted so that they can tilt in a suitable manner between lateral guards 10. A fluid pressure cushion 11 which is located in a sealed space between inner surface 12 of bearing housing 4 and upper face 13 of ring 7, serves to damp shaft bearing arrangement 1. In the lower portion of this fluid pressure cushion 11 a spring plate 14 is located, which receives the rotor weight of the electrical machine.

In addition, a second stage elastic suspension 15 is provided in bearing housing 4. It consists of a second flexible bearing support, which is further comprised of of a spring cage—in this case a ring 16 fastened to bearing housing 4, which is connected by means of bar springs 17 to a second ring 18. This second ring 18 has, at each of three points separated by 120°, a threaded bolt 19, which is fastened by nut 20 to ring 18, and whose rounded dome 22, the height of which can be adjusted by square adjusting key 21, limits the clearance 23 between the first spring-suspended bearing flange 5 and the second stage elastic suspension 15. This clearance 23 has been made smaller than the potential spring excursion of bearing support 5.

A second stage damping spring providing a second stage elastic suspension is depicted in FIGS. 1 and 2. These figures diagrammatically show the spring 24 as either a selectable or an adjustable auxiliary spring. The rigidity of this second stage spring is chosen in such a manner that the negative effect of the magnetic pull is optimally compensated. The additional deflection resulting from the second stage unit directional static magnetic residual pull remains as small as possible while for the second stage activated state the best possible damping effect is achieved.

Figure 3:
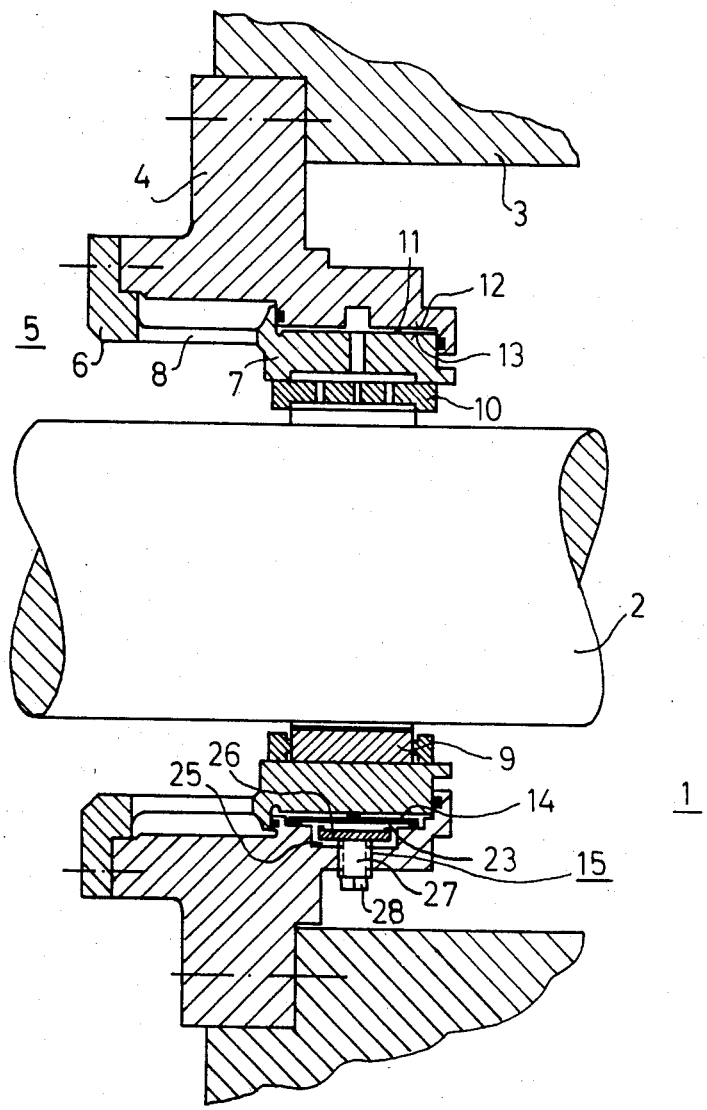
FIGS. 3, 4 and 5 show portions of longitudinal sections of alternate shaft bearing arrangements.

In the embodiment shown in FIG. 3, the second stage rigidity is achieved by altering the support parameters for spring plate 14 that supports the rotor weight. For this purpose, there is provided in bearing housing 4 an expanded recess 25 in the lower section of fluid pressure cushion 11, in which spring plate 14 is located. In the recess, a second stage support plate 26 can be adjusted by means of a threaded bolt 27 and a square key 28 with regard to its height. The secondary support plate 26 thus forms the second stage elastic suspension 15. The clearance 23, which is now located between second stage support plate 26 and spring plate 14, accordingly corresponds to the clearance between first movable bearing flange 5 and second stage elastic suspension 15.

Figure 4:
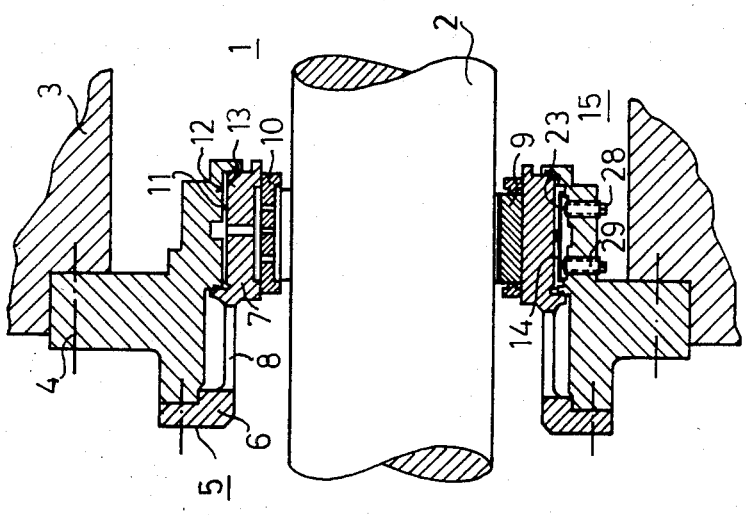

In the embodiment shown in FIG. 4, an alteration of the support method for spring plate 14 has likewise been provided. For this purpose, under spring plate 14 in bearing housing 4 there have been mounted several powerful setscrews 29, which also have a square adjusting key 28, which makes it possible to determine clearance 23 between the face of bolt 29 and spring plate 14 accurately in each case.

The embodiments shown in FIGS. 3 and 4, in which the second stage elastic suspension 15 is mounted at only one point on the circumference, that is, in the lower area in which spring plate 14 that receives the weight of the rotor is located, are suitable for machine sets with a horizontal shaft 2, which is exposed to differing force or spring effects only in a vertical direction. They can be used to advantage when the only requirement is to avoid an excessive eccentricity of the movable bearing support 5 in the fluid pressure cushion 11 as the result of differing static vertical forces.

An embodiment similar to that in FIG. 3 could, however, also be used for an electrical machine with a vertical shaft, if the second stage support plate were to be mounted at three points 120° apart along the circumference, with a clearance 23 to the first movable bearing support 5. In this case, to prevent sliding, the second stage spring-suspended support plates should possess a small degree of lateral mobility.

Figure 5:
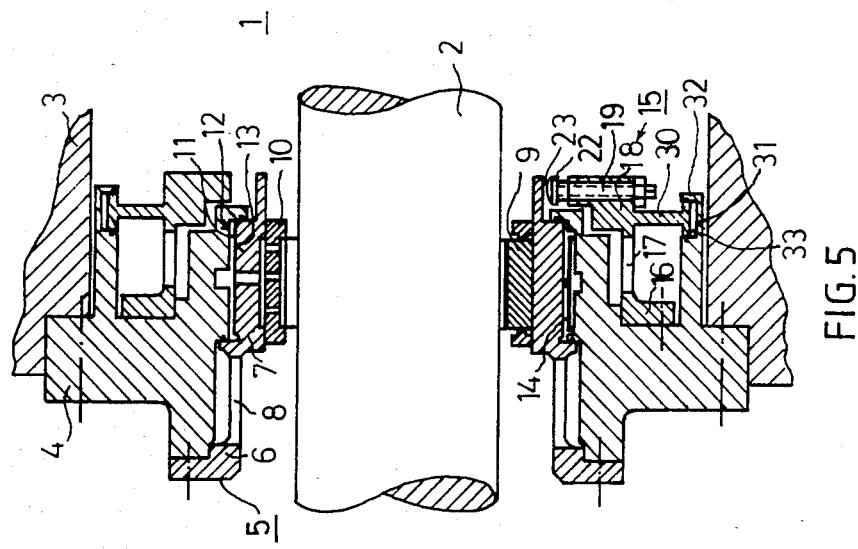

Finally, in FIG. 5 there is shown an embodiment that represents a modification of the embodiment of FIGS. 1 and 2, in that another external auxiliary damping device is provided. For this purpose, the spring cage forming the second stage elastic suspension 15, which consists of a ring 16 fastened to bearing housing 4 and connected by means of bar springs 17 with a second ring 18, whose clearance 23 to the first movable bearing flange 5 is adjusted by the threaded bolts 19, is altered, inasmuch as it is provided with a projection 30, which protrudes into a recess 31 of a projection 32 of bearing housing 4. Since projection 30 is sealed off from the side walls of recess 31, it is possible here to introduce a second fluid pressure cushion 33. This provides a further means of adapting the shaft bearing arrangement to specific operating states.

There has thus been shown and described a flexibly damped shaft bearing arrangement, particularly for use in electrical machinery which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variailtions and other uses and applications which do not depart from the spirit and scope of the invention are deemed to be covered by the invention which is limited only by the claims which follow.

What is claimed is:

1. In a flexibly damped shaft-bearing arrangement, in electrical machines, with a bearing housing that surrounds the shaft in a ring and a movable bearing support, which contains the shaft bearing and is suspended radially by first stage springs in the bearing housing, with a recess in the bearing housing, provided with lateral seals, being left between the bearing housing and the bearing support in order to accommodate a fluid pressure cushion, the improvement comprising a second stage elastic suspension provided between the bearing housing and the bearing support, which, when the machine provided with such bearings is not operating, has a clearance with respect to the bearing support which is smaller than the potential spring excursion of the bearing support said second stage elastic suspension having means for providing support between the bearing housing and the bearing support when the clearance between the first stage springs and second stage springs is taken up for changing the elasticity of the bearing assembly.

2. The flexibly damped shaft bearing arrangement of claim 1, wherein the clearance between the movable bearing support and the second stage suspension is adjustable.

3. The flexibly damped shaft bearing arrangement of claim 1, wherein the rigidity of the second stage suspension is adjustable.

4. The flexibly damped shaft bearing arrangement of claim 1, wherein a recess equipped with lateral seals, to accommodate a second fluid pressure cushion, is also provided between the second stage suspension and the bearing housing.

5. The flexibly damped shaft bearing arangement of claim 3, wherein a spring cage is used as the spring element for the second stage suspension.

6. The flexibly damped shaft bearing arrangement of claim 1, wherein the second stage suspension is mounted at the mid-level of the movable bearing support.

7. The flexibly damped shaft bearing arrangement of claim 6, wherein the second stage suspension is mounted under a spring plate that supports the weight of the shaft, in the fluid pressure cushion.

8. In a flexibly damped shaft-bearing arrangement, in electrical machines, with a bearing housing that surrounds the shaft in a ring and a movable bearing support, which contains the shaft bearing and is suspended radially by first stage springs in the bearing housing, with a first plurality of recesses in the bearing housing equally spaced around a first circle concentric wih the shaft, provided with lateral seals, being left between the bearing housing and the bearing support in order for each said recess to accommodate one of a first plurality of fluid pressure cushions, the improvement comprising:
 a second stage elastic suspension provided between the bearing housing and the bearing support, which, when the machine provided with such bearings is not operating, has a clearance with respect to the bearing support which is smaller than the potential spring excursion of the bearing support said second stage elastic suspension having means for providing support between the bearing housing and the bearing support when the clearance between the first stage springs and second stage springs is taken up for changing the elasticity of the bearing assembly; and
 a second plurality of recesses equally spaced around a second circle concentric with the shaft, each equipped with lateral seals to accommodate in each of said second plurality of recesses a second fluid pressure cushion, is provided between the second stage suspension and the bearing housing.

9. In a flexibly damped shaft-bearing arrangement, in electrical machines, with a bearing housing that surrounds the shaft in a ring and a movable bearing support, which contains the shaft bearing and is suspended radially by first stage springs in the bearing housing, with a recess in the bearing housing, provided with lateral seals, being left between the bearing housing and the bearing support in order to accommodate a fluid pressure cushion, the improvement comprising a second stage elastic suspension provided between the bearing housing and the bearing support, which, when the machine provided with such bearings is not operating, has a clearance with respect to the bearing support which is smaller than the potential spring excursion of the bearing support said seconds stage elastic suspension having means for providing support between the bearing housing and the bearing support when the clearance between the first stage springs and second stage springs is taken up for changing the elasticity of the bearing assembly and when the machine provided with such bearings is operating in other than a steady-state, excited condition, the potential spring excursion of the second stage suspension beyond the not-operating clearance distance is smaller than the thickness of the fluid pressure cushion.

10. The flexibly damped shaft bearing arrangement of claim 9, wherein the clearance between the movable bearing support and the second stage suspension is adjustable.

11. The flexibly damped shaft bearing arrangement of claim 9, wherein the rigidity of the second stage suspension is adjustable.

12. The flexibly damped shaft bearing arrangement of claim 9, wherein a recess equipped with lateral seals, to accommodate a second fluid pressure cushion, is also provided between the second stage suspension and the bearing housing.

13. The flexibly damped shaft bearing arrangement of claim 11, wherein a spring cage is used as the spring element for the second stage suspension.

14. The flexibly damped shaft bearing arrangement of claim 9, wherein the second stage suspension is mounted at the mid-level of the movable bearing support.

15. The flexibly damped shaft bearing arrangement of claim 14, wherein the second stage suspension is mounted under a spring plate that supports the weight of the shaft, in the fluid pressure cushion.

* * * * *